United States Patent [19]

Chaplin

[11] Patent Number: 4,920,415

[45] Date of Patent: Apr. 24, 1990

[54] SELF KEYER

[75] Inventor: Daniel J. Chaplin, Nevada City, Calif.

[73] Assignee: The Grass Valley Group, Inc., Nevada City, Calif.

[21] Appl. No.: 325,844

[22] Filed: Mar. 20, 1989

[51] Int. Cl.⁵ .............................................. H04N 5/272
[52] U.S. Cl. ..................................... 358/183; 358/182
[58] Field of Search ............... 358/182, 183, 160, 22, 358/167

[56] References Cited

U.S. PATENT DOCUMENTS

| | | | |
|---|---|---|---|
| 3,970,774 | 7/1976 | Bazin et al. | 358/182 X |
| 4,689,681 | 8/1987 | Jackson | 358/183 |
| 4,743,970 | 5/1988 | Barnett et al. | 358/183 |
| 4,771,192 | 9/1988 | Jackson | 358/183 X |
| 4,800,432 | 1/1989 | Barnett et al. | 358/160 |
| 4,811,104 | 3/1989 | Kawabe | 358/22 X |

Primary Examiner—Howard W. Britton
Assistant Examiner—Mark R. Powell
Attorney, Agent, or Firm—Francis I. Gray

[57] ABSTRACT

An improved self keyer preconditions a fill video prior to mixing with a background video under control of a self key signal derived from the fill video. A variable gray luminance signal is substituted for low luminance portions of the fill video under control of a precondition key signal derived from the self key signal to produce the preconditioned fill video. The resulting output video has a smooth luminance transition between the fill and background videos in lieu of an unpleasant black artifact at the edges of the fill video.

11 Claims, 3 Drawing Sheets

SELF KEYER

BACKGROUND OF THE INVENTION

The present invention relates to video key generators, and more particularly to an improved self keyer that minimizes black content at the boundary between a background video and fill video.

A self key signal is generated from a fill video that is to be inserted over a background video. The transition between the background video and the fill video has some duration and the edge of the fill video is bounded by black, or the absence of a signal, so that the resulting transition has some black content remaining that is visible and undesirable. This black content artifact is especially noticeable when the luminance of the fill and background videos are similar so that a gap is visually apparent between them. Traditionally when this condition exists, a high gain key signal with a high value clip level is selected in the key generator so that the gap is very narrow and the luminance of the fill video in the gap is high. However this has a rather unpleasant appearance because the edge of the resultant key signal is harsh and any noise in the edge is noticeable.

A conventional self keyer is shown in FIG. 1. The fill and background videos are input to a mixer 10 at ports X and Y, respectively, together with a key signal, or mixer control signal, at port Z. The key signal is derived from the fill video by inputting to the fill video to a clip and gain amplifier (keyer) 12 that generates the key signal according to the settings of the clip and gain controls. A delay line 11 is interposed between the fill video input and the mixer 10 to compensate for the processing time of the keyer 12. As shown in FIG. 2 for three different clip and gain settings the output from the mixer 10 has a certain amount of black content at the edges of the fill video.

What is desired is an improved self keyer that minimizes the black content and the resulting undesirable appearance at the boundary of the transition between background and fill videos.

SUMMARY OF THE INVENTION

Accordingly the present invention provides an improved self keyer that preconditions a fill video by replacing low luminance portions of the fill video with a variable gray luminance signal. In one embodiment a derived self signal key from a conventional self keyer is input to a second key generation circuit to produce a second key signal having sharp edges. The second key signal is used to mix the fill video with the variable gray luminance signal to produce the preconditioned fill video that is then mixed with a background video under control of the derived self key signal. The resulting transition boundary is some shade of gray with minimum black content that eliminates the usual unpleasant black content at the transition boundary.

The objects, advantages and novel features of the present invention are apparent from the following detailed description when read in view of the appended claims and attached drawing.

DESCRIPTION OF THE PREFERRED EMBODIMENT

Figure 3:
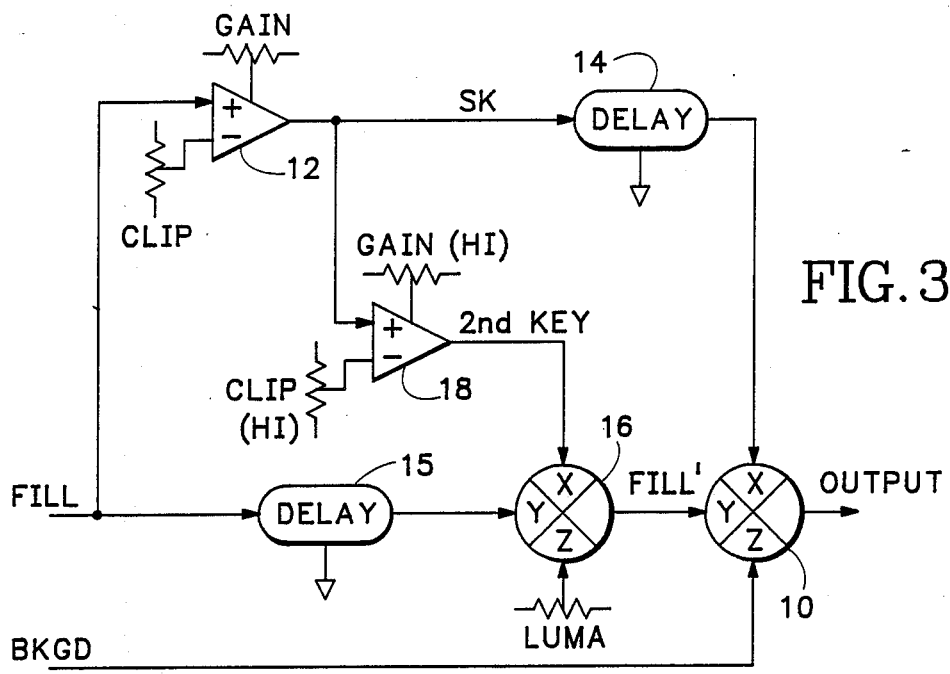
FIG. 3 is a block diagram of an improved self keyer according to the present invention.

Referring now to FIG. 3 a self key signal is derived from a fill video using a conventional clip and gain amplifier 12. The self key signal is input via a delay line 14 to a conventional mixer 10. The self key signal also is input to a second clip and gain amplifier (keyer) 18 to produce a second, or preconditioned, key signal. The second key signal is input to a second mixer 16. The second key signal mixes an input fill video with a gray luminance signal to produce a preconditioned fill signal that has the low luminance portion replaced with the gray luminance signal. The gray luminance gray signal is adjustable to provide a visual match with the fill video. The preconditioned fill signal is mixed with a background video signal under control of the self key signal, delayed by the delay line 14 to compensate for the processing delay in the second keyer 18, to produce an output video. A delay line 15 between the fill video input and the second mixer 16 compensates for the processing times of the first and second keyers 12, 18.

Figure 4:
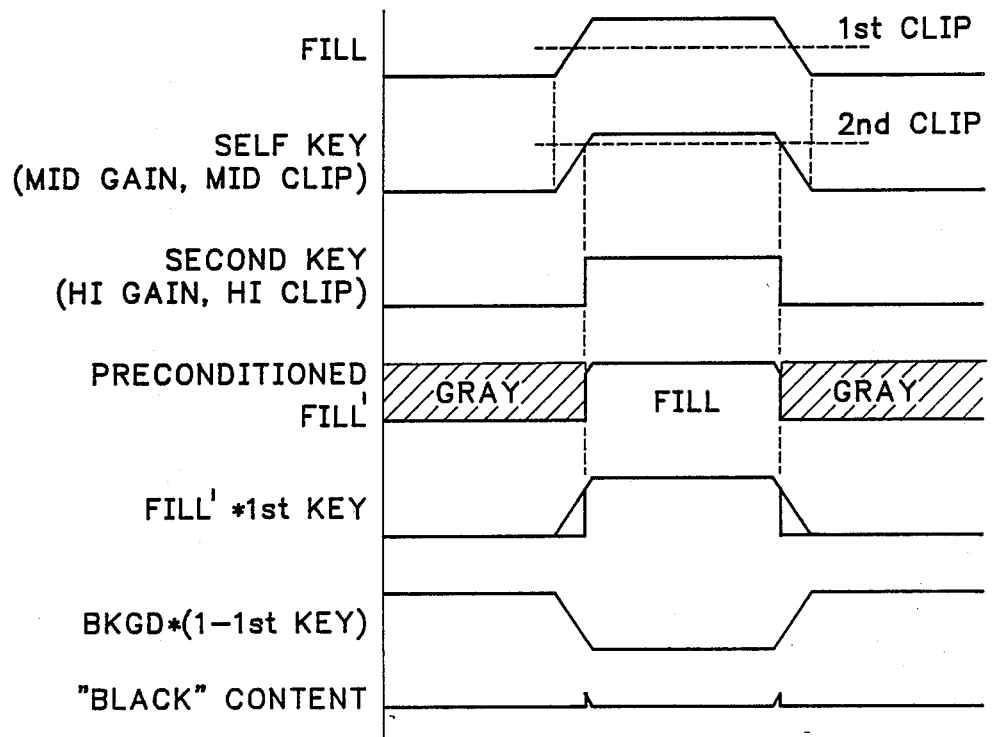
FIG. 4 is a waveform diagram exemplifying the operation of the improved self keyer of FIG. 4.

As shown in FIG. 4 the self key signal is derived from the fill video using medium clip and gain levels. The second key signal is derived from the self key signal using high clip and gain levels. The preconditioned fill video from the second mixer 16 is a shade of gray as determined by the gray luminance signal with a sharp transition to the fill video due to the sharp edges of the second key signal. The resulting output video has a smooth luminance transition between the background and fill videos, and thus essentially eliminates the unpleasant black border at the fill video edges present with conventional self keyers.

Figure 1:
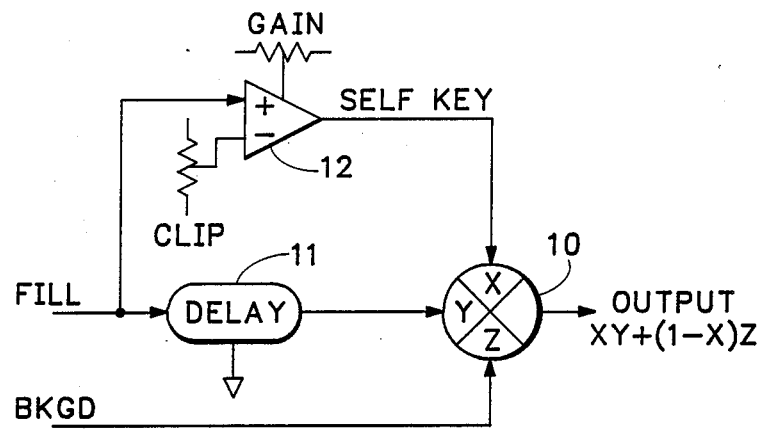
FIG. 1 is a block diagram of a conventional self keyer.
Figure 5:
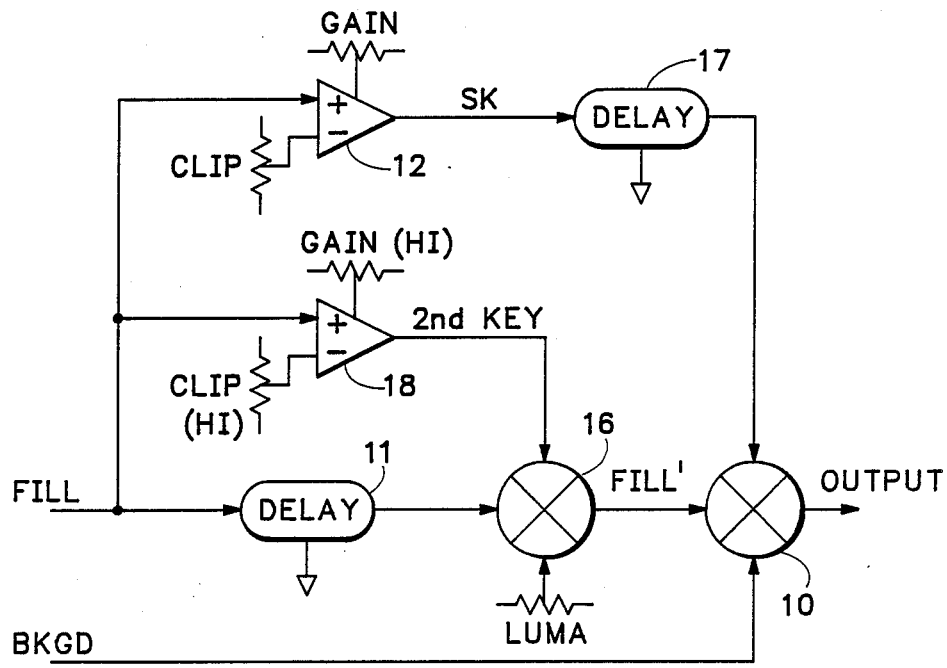
FIG. 5 is a block diagram of an alternate embodiment of an improved self keyer according to the present invention.
Figure 2:
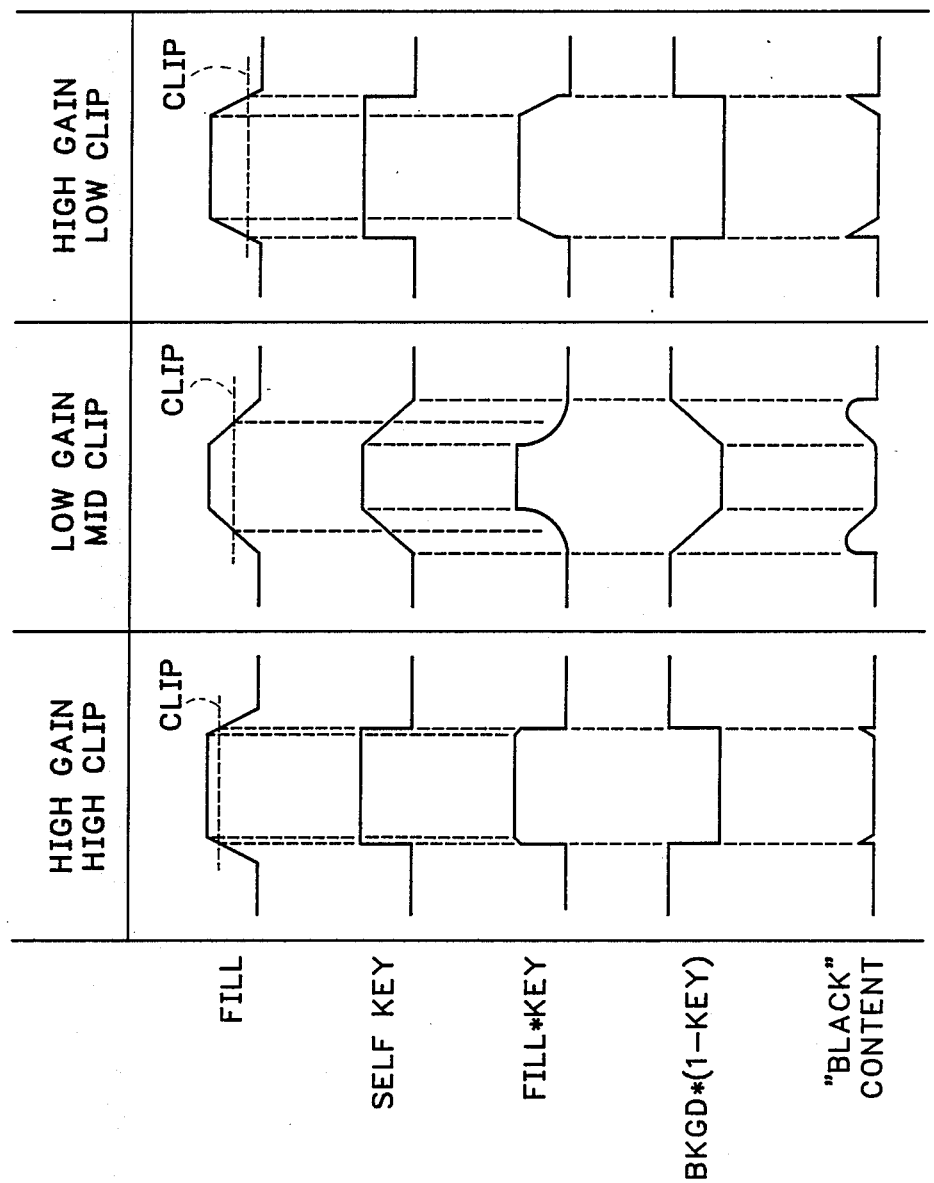
FIG. 2 is a waveform diagram exemplifying the operation of the conventional self keyer of FIG. 1.

An alternate embodiment is shown in FIG. 5 where the second key signal also is derived directly from the fill video. A delay line for the self key signal from the first keyer 12 compensates for the processing delay through the second mixer 16. With the black replaced with gray in the fill video, the self key signal may be adjusted over a greater range, allowing the generation of softer key edges that are more visually pleasant and less noisy. Also, since the self key signal is not narrowed, fine details in the fill video are preserved, giving the impression of higher resultant detail. Additionally anti-aliased edges, which are normally destroyed when self keying with high gain and clip values, are preserved.

Thus the present invention provides an improved self keyer that presents a smooth luminance transition between background and fill videos by deriving a second key signal from a self key signal derived from the fill video, and using the second key signal to generate a preconditioned fill video having a shade of gray at the edge.

What is claimed is:

1. An improved self keyer of the type having means for deriving a self key signal from a fill video and means for mixing the fill video with a background video under control of the self key signal to produce an output video, the improvement comprising means for preconditioning the fill video prior to input to the mixing means by replacing low luminance portions of the fill video with a variable transition signal.

2. An improved self keyer as recited in claim 1 wherein the preconditioning means comprises:
   means for deriving a second key signal from the self key signal; and
   means for mixing the fill video with the transition signal under control of the second key signal to produce the preconditioned fill video.

3. An improved self keyer as recited in claim 1 wherein the preconditioning means comprises:
   means for deriving a second key signal from the fill video; and
   means for mixing the fill video with the transition signal under control of the second key signal to produce the preconditioned fill video.

4. A self keyer comprising:
   means for combining a fill video with a background video under control of a self key signal derived from the fill video to produce an output video; and
   means for preconditioning the fill video prior to input to the combining means by replacing low luminance portions of the fill video with a variable transition signal.

5. A self keyer as recited in claim 4 wherein the combining means comprises:
   means for deriving the self key signal from the fill video; and
   means for mixing the preconditioned fill video with the background video under control of the self key signal to produce the output signal.

6. A self keyer as recited in claim 4 wherein the preconditioning means comprises:
   means for deriving a second key signal from the self key signal; and
   means for mixing the fill video with the transition signal under control of the second key signal to produce the preconditioned fill video.

7. A self keyer as recited in claim 4 wherein the preconditioning means comprises:
   means for deriving a second key signal from the fill video; and
   means for mixing the fill video with the transition signal under control of the second key signal to produce the preconditioned fill video.

8. A method of generating an output video that is a combination of a fill video and a background video comprising the steps of:
   preconditioning the fill video to replace low luminance portions of the fill video with a variable luminance gray signal; and
   mixing the preconditioned fill video with the background video under control of a key signal derived from the fill video to produce the output video.

9. A method as recited in claim 8 wherein the mixing step comprises the steps of:
   deriving the self key signal from the fill video; and
   mixing the preconditioned fill video with the background video under control of the self key signal to produce the output signal.

10. A method as recited in claim 8 wherein the preconditioning step comprises the steps of:
    deriving a second key signal from the self key signal; and
    mixing the fill video with the transition signal under control of the second key signal to produce the preconditioned fill video.

11. A method as recited in claim 8 wherein the preconditioning step comprises the steps of:
    deriving a second key signal from the fill video; and
    mixing the fill video with the transition signal under control of the second key signal to produce the preconditioned fill video.

* * * * *